United States Patent
Choi

(10) Patent No.: US 12,458,978 B2
(45) Date of Patent: Nov. 4, 2025

(54) HOMOGENIZER WITH AN ENHANCING HOMOGENIZING PROPERTY

(71) Applicant: In Soo Choi, Seongnam-si (KR)

(72) Inventor: In Soo Choi, Seongnam-si (KR)

( * ) Notice: Subject to any disclaimer, the term of this patent is extended or adjusted under 35 U.S.C. 154(b) by 534 days.

(21) Appl. No.: 17/986,331

(22) Filed: Nov. 14, 2022

(65) Prior Publication Data
US 2024/0157371 A1   May 16, 2024

(51) Int. Cl.
*B02C 19/00* (2006.01)
*B02C 19/18* (2006.01)
*B82Y 40/00* (2011.01)

(52) U.S. Cl.
CPC ........ *B02C 19/18* (2013.01); *B02C 2019/183* (2013.01); *B82Y 40/00* (2013.01); *C01P 2004/64* (2013.01)

(58) Field of Classification Search
CPC .... B02C 19/18; B02C 2019/183; B82Y 40/00
See application file for complete search history.

(56) References Cited

U.S. PATENT DOCUMENTS

| | | | |
|---|---|---|---|
| 2011/0091360 A1* | 4/2011 | Hassan | C07C 51/56 422/198 |
| 2020/0215724 A1* | 7/2020 | Capobianco | B29B 13/10 |

FOREIGN PATENT DOCUMENTS

KR   101073382   10/2011

OTHER PUBLICATIONS

Machine Translation of KR101073382 to Kim. (Year: 2022).*

* cited by examiner

*Primary Examiner* — Anshu Bhatia
(74) *Attorney, Agent, or Firm* — CANTOR COLBURN LLP

(57) ABSTRACT

Provided is a homogenizer with an enhancing homogenizing property. A homogenizer comprises an inputting container 11 for inputting a raw material solution; a pressing module 13 for applying a pressure to the input raw material solution; a homogenizing module 15 for making the raw material solution as a homogenous solution using a pressure applied by the pressing module 13; a heat exchanger 17 for stabilizing and discharging the homogeneous solution; and an ultrasonic wave unit 18a, 18b, 18c for applying an ultrasonic wave to the raw material solution or the homogeneous solution.

9 Claims, 6 Drawing Sheets

HOMOGENIZER WITH AN ENHANCING HOMOGENIZING PROPERTY

BACKGROUND OF THE INVENTION

1. Field of the Invention

The present invention relates to a homogenizer with an enhancing homogenizing property.

2. Description of the Related Art

A homogenizer may be used for making a certain size of particle or floating material be stable condition by crushing finely, and can be applied to various industrial fields such as ink compositions, pharmaceuticals, dyes, surfactants, silicones, cosmetics, resins or a food industry. In general, the homogenizer may pass a dispersion medium containing a dispersoid through a milling unit made of a diamond material for crushing the dispersion medium using a cavitation, a sheer force or a whirling flow. In relation to the homogenizer, Korean registration number 10-1073382 discloses a high pressure homogenizer for preventing a raw material from being solidified. The homogenizing process in the homogenizer may be performed in a process of passing through the milling unit with a high pressure in a course of transferring, but it is advantageous that the dispesoid is dispersed within the dispersion medium in a homogeneous state before being put into a homogenizing area. And also, it is advantageous that a homogenized state can be maintained in a course of transferring after passing the homogenizing area. The dispersion medium may be maintained in a high pressure condition in the course of transferring, and hence a uniform density may be not sustained because of a non-uniformity of a partial pressure. Therefore, a method for solving such problem is required. But the known inventions don't disclose a method for solving the problem.

The present invention for solve the problem of the known inventions has a purpose as following.

PURPOSE OF THE INVENTION

An object of the present invention is to provide with a homogenizer with an enhanced homogenizing property by providing a structural characteristic and applying an ultrasonic wave.

SUMMARY OF THE INVENTION

According to one embodiment of the present invention, a homogenizer comprises an inputting container for inputting a raw material solution; a pressing module for applying a pressure to the input raw material solution; a homogenizing module for making the raw material solution as a homogenous solution using a pressure applied by the pressing module; a heat exchanger for stabilizing and discharging the homogeneous solution; and an ultrasonic wave unit for applying an ultrasonic wave to the raw material solution or the homogeneous solution.

According to other embodiment of the present invention, the homogeneous module comprises a staying volume formed at a passage to connect a transferring pipe for transferring the raw material solution.

According to another embodiment of the present invention, the homogeneous module comprises a homogeneous cell changing a flowing passage to cause an impact of the raw material solution.

According to still another embodiment of the present invention, an impact inducing block is placed within the homogeneous cell for causing the raw material solution to flow in a horizontal and vertical direction.

According to still another embodiment of the present invention, the raw material solution becomes a water and an oil.

According to still another embodiment of the present invention, the ultrasonic wave unit is arranged at the heat exchanger.

According to still another embodiment of the present invention, the ultrasonic wave unit applies an ultrasonic wave of 20 kHz to 10 MHz frequency.

According to still another embodiment of the present invention, the pressure applied by the pressing module 13 becomes 10,000 to 40,000 psi.

According to still another embodiment of the present invention, the homogenizer comprises an inverse flow guiding module.

DETAILED DESCRIPTION OF EXEMPLARY EMBODIMENTS

Exemplary embodiments of the present invention will be described herein below with reference to the accompanying drawings.

Figure 1:
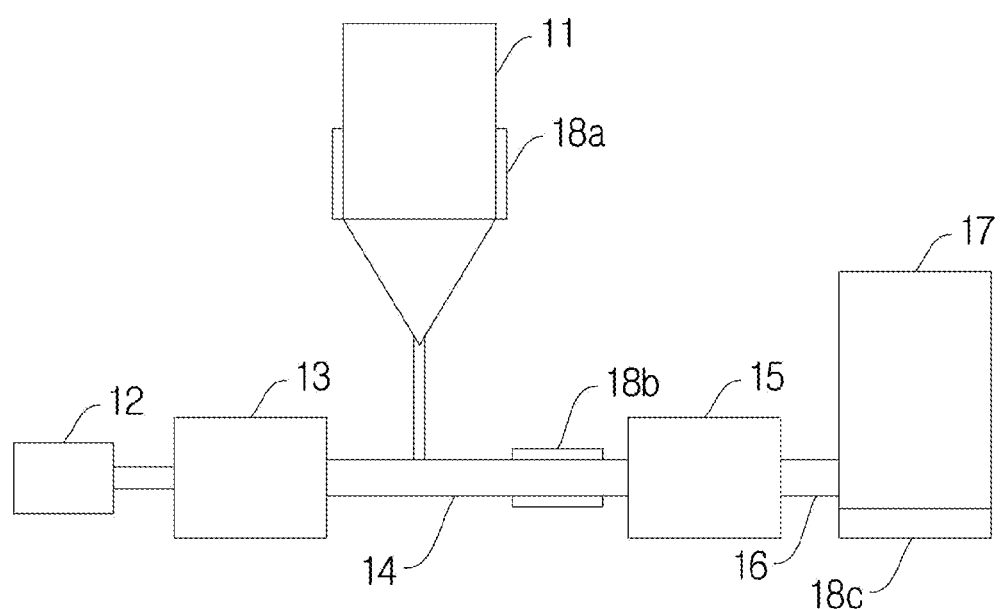
FIG. 1 shows an exemplary embodiment of the homogenizer according to the present invention.

FIG. 1 shows an exemplary embodiment of the homogenizer according to the present invention.

Referring to FIG. 1, a homogenizer comprises an inputting container 11 for inputting a raw material solution; a pressing module 13 for applying a pressure to the input raw material solution; a homogenizing module 15 for making the raw material solution as a homogenous solution using a pressure applied by the pressing module 13; a heat exchanger 17 for stabilizing and discharging the homogeneous solution; and an ultrasonic wave unit 18a, 18b, 18c for applying an ultrasonic wave to the raw material solution or the homogeneous solution.

When the raw material solution stored in the inputting container is guided to the transferring passage 14, a driving unit 12 such as a pump or a motor may actuate the pressing module 13 such as a plunger capable of moving in a round trip. The raw material solution may become a material made to be homogeneous state by the homogenizer, and the raw material solution may comprise at least one solvent and at least one solute. The raw material solution may become various solutions such as a food industry containing a cooking oil, a powdered milk, a margarine or a mayonnaise, or a chemical industry containing an ink, a soap, a fuel oil, a vitamin, a toothpaste, a paint or a perfume. And also, the raw material solution may comprise a medical product, a dying product, a silicone product, a resin product and the like, not limited to. The raw material solution may be transferred along the transferring pipe 14 under being pressed to be input into the homogeneous module 15. The homogeneous module 15 may have a function to collide the raw material solution for making the homogenous solution by crushing be a nanometer size and mixing the crushed material. The homogeneous solution formed by the homogeneous module 15 may be guided to the heat exchanger 17 via a guiding pipe 16, and then the homogeneous solution may be discharged outside after stabilizing.

According to one embodiment of the present invention, the ultrasonic wave may be applied to the raw material solution or the homogeneous solution. Specifically, the ultrasonic wave may be applied to the raw material solution by the ultrasonic wave unit 18a installed at an inner part or outer part of the inputting container 11. The ultrasonic wave may be applied to the flowing raw material by the ultrasonic wave unit 18b installed at the transferring pipe 14. And also, the ultrasonic wave unit 18c may be installed at the heat exchanger 17. For example, the ultrasonic wave unit 18c may be installed at a lower part of the heat exchanger 17 for applying the ultrasonic wave to the homogeneous solution flowing within the heat exchanger 17. A homogeneity and a stability of the homogeneous solution can be enhanced by applying the ultrasonic wave. The ultrasonic wave unit 18a, 18b, 18c may be installed at various places to apply the ultrasonic wave to the raw material solution or the homogeneous solution. The ultrasonic wave unit 18a, 18b, 18c may apply the ultrasonic wave with various frequencies, for example, 20 kHz to 10 MHz frequency. An ultrasonic of various frequencies may be applied to the raw material solution or the homogeneous solution, not limited to.

Figure 2:
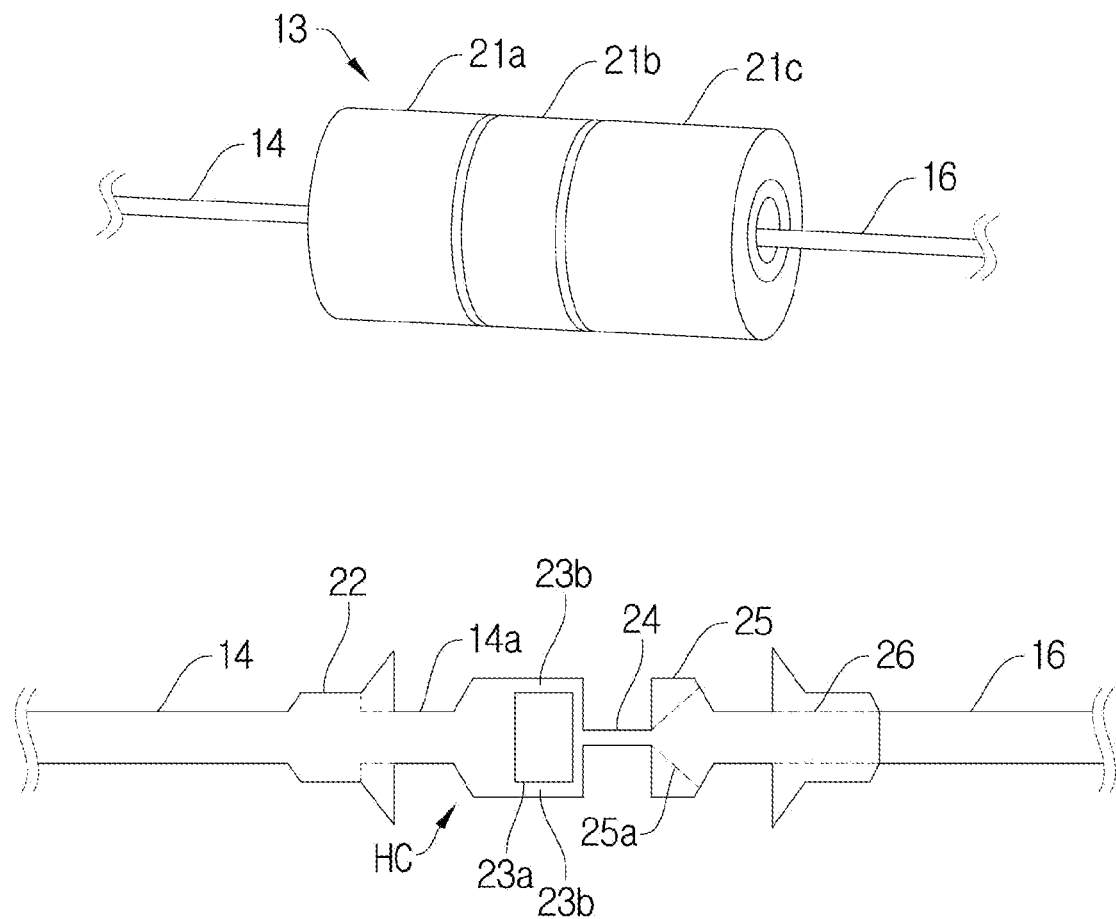
FIG. 2 shows an exemplary embodiment of the homogenizing module of the homogenizer according to the present invention.

FIG. 2 shows an exemplary embodiment of the homogenizing module of the homogenizer according to the present invention.

Referring to FIG. 2, the raw material solution transferred along the transferring pipe 14 may be input into the homogeneous module 15, and the homogeneous module 15 may comprise three protecting blocks 21a, 21b, 21c. Each protecting block 21a, 21b, 21c may have a cylindrical shape or a drum shape, and the protecting blocks 21a, 21b, 21c may be connected to each other. The length of the first and the third protecting block 21a, 21c may be longer than that of the second block 21b. The protecting blocks 21a, 21b, 21c may be made of a material with a big specific gravity such as a metal, and the protecting blocks 21a, 21b, 21c may have a structure that an outer vibration or impact can't be delivered to a homogeneous means arranged inside. An inner guiding passage formed within the homogeneous module 15 may be connected to the transferring pipe 14, and a staying volume 22 may be formed at the inner guiding passage. An inner diameter of the staying volume 22 may be bigger than that of the inner guiding passage, and the staying volume 22 may be connected to an inner transferring passage 14a. And the diameter of the inner transferring passage 14a may be similar or equal to that of the transferring pipe 14. A homogeneous cell HC may be connected to the inner transferring passage 14a. The homogeneous cell HC may comprise a homogeneous passage having a bigger diameter relative to that of the inner transferring passage 14a and an impact guiding block 23a arranged within the homogeneous passage. The raw material solution input into the homogeneous cell HC from the inner transferring passage 14a may be introduced to an entering volume having a bigger diameter relatively to be impacted on the impact guiding block 23a. And then the solution may flow in a horizontal direction along a gap passage 23b formed between the impact guiding block 23a and the homogeneous cell HC. And then, the solution may flow along a cavitation passage 24 having a smaller diameter relative to that of the inner transferring passage 14a at an end part of the impact guiding block 23a, And the raw material solution may be guided to a diffusing block 25 with a diffusing passage 25a. The diffusing passage 25a may have a trumpet shape or a cone shape, and the raw material solution guided along the diffusing passage 25a may flow a homogeneous discharging passage 26 connected to the guiding passage 16. As mentioned above, the homogeneous solution may be generated through an impacting, a mixing, a sheer force and a cavitation process within the homogeneous cell HC. The structure of the homogeneous cell HC will be explained below.

Figure 3:
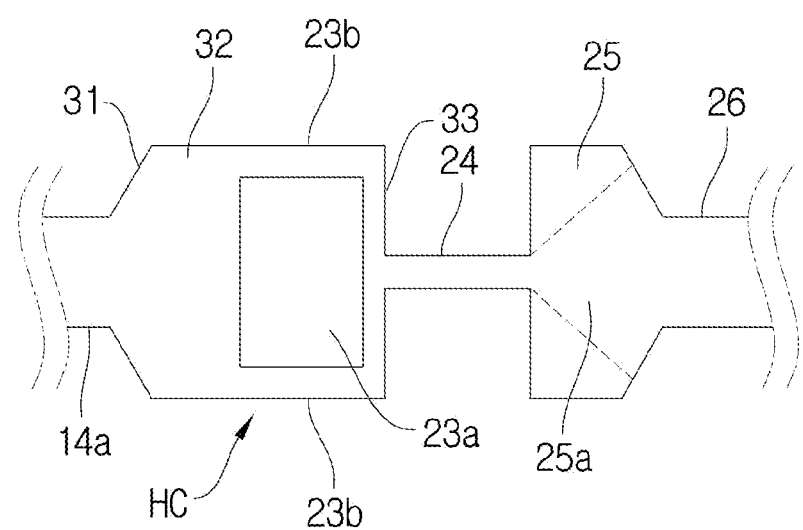
FIG. 3 shows an exemplary embodiment of the inner flowing structure of FIG. 2.

FIG. 3 shows an exemplary embodiment of the inner flowing structure of FIG. 2.

Referring to FIG. 3, the homogeneous cell HC connected to the inner transferring passage 14a may comprise a tilted guiding part 31 and a route forming volume 32, wherein a section size of the tilted guiding part 31 becomes larger gradually in an extending direction, and the route forming volume 32 may extend from the tilted guiding part 31 with a cylindrical shape and with a constant diameter. And an impact guiding block 23a may be arranged within an inner portion of the route forming volume 32. The impact guiding block 23a may become a cylindrical shape and the diameter and the length of the impact guiding block 23a may be smaller than those of the route forming volume 32. For example, the diameter of the impact guiding block 23a may become ½ to 9/10 to the impact guiding block 23a diameter. And the length of the impact guiding block may become ⅖ to ¾ to the route forming volume 32 length. A vertical guiding passage 33 may be formed apart from the rear surface of the route forming volume 32, and the section size of the vertical guiding passage 33 may be smaller than that of the gap passage 23b. The raw material solution may flow in a horizontal direction along the gap passage 23b, and then flow in a vertical direction along the vertical guiding passage 33. The cavitation passage 24 may be connected to a center portion of the route forming volume 32, the section size of the cavitation passage 24 may be ⅕ to ½ to the section size of the inner transferring passage 14a, and for example, the section size of the cavitation passage 24 may become a nozzle shape with 60 to 85 μm diameter. The raw material solution flowing along the inner transferring passage 14a may be guided to the diffusing block 25 with the diffusing passage 25a. And then, the homogeneous solution made for the raw material solution may flow to the heat exchanger in a homogeneous solution state.

Figure 4:
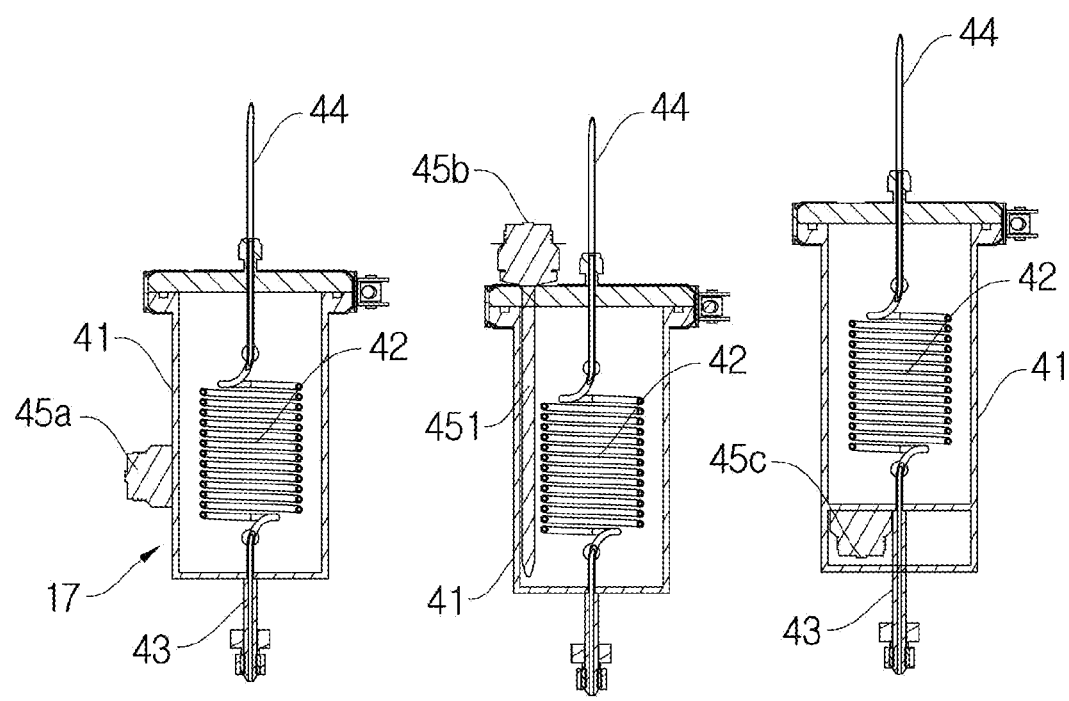
FIG. 4 shows an exemplary embodiment of the heat exchanger according to the present invention.

FIG. 4 shows an exemplary embodiment of the heat exchanger according to the present invention.

Referring to FIG. 4, the heat exchanger 17 may comprise a housing 41; a heat exchanging tube 42 formed within the housing 41 and with a coil shape; an entering tube 43 for transferring the homogeneous solution to the heat exchanging tube 42; and a discharging tube 44 for discharging the homogeneous solution from the heat exchanging tube 42 to a storing tank for storing the homogeneous solution.

A coolant tube for guiding a coolant within the heat exchanger 17 may be arranged. The ultrasonic wave units 45a, 45b, 45c may be installed at various places of the housing 41. The ultrasonic wave units 45a, 45b, 45c may be installed at a round surface of the housing 41, may be installed at a cover of the housing 41, or may be installed at a lower surface of the housing. When the ultrasonic wave unit 45a is installed at the cover of the housing 41, an ultrasonic wave transferring member 451 may be coupled to the ultrasonic wave unit 45a for applying the ultrasonic wave to the homogenous solution flowing within the housing 41. When the ultrasonic wave unit 45c is placed under the housing 41, an ultrasonic wave transferring plate 411b may be installed under the housing 41. A plurality of vibrating elements may be placed at the transferring plate 411b, and the ultrasonic wave may be guided in a predetermined direction by the vibrating elements. The ultrasonic wave unit 45a, 45b, 45c may be arranged at various places of the heat exchanger 17 to apply the ultrasonic wave to the homogeneous solution flowing along the heat exchanging tube 42. And the ultrasonic wave unit 45a, 45b, 45c may have a proper structure to apply the ultrasonic wave to the homogeneous solution.

Figure 5:
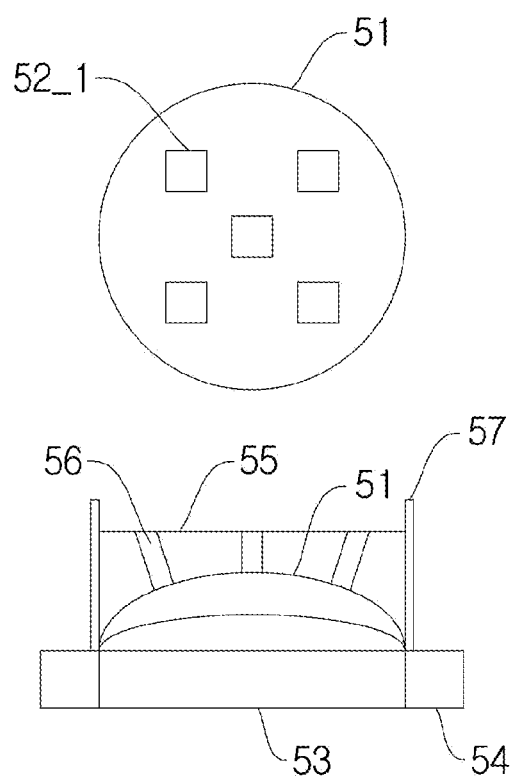
FIG. 5 shows an exemplary embodiment of the ultrasonic wave unit according to the present invention.

FIG. 5 shows an exemplary embodiment of the ultrasonic wave unit according to the present invention.

Referring to FIG. 5, the ultrasonic wave unit may comprise a direction guiding unit 51 and a plurality of vibrating elements 52_1 to 52_N arranged at the direction guiding unit 51. And also, the ultrasonic wave unit may comprise a transferring unit 55 and a transfer limiting member 57 formed at a rounding surface of the transferring unit 55. And also, the ultrasonic unit may comprise a fixing unit 53, and the ultrasonic wave limiting unit 54 may be arranged at a rounding surface of the fixing unit 53. Each vibrating element 52_1 to 52_N may comprise a piezo-electric element, and may be made as a transducer to convert an electric vibration into a mechanical vibration. The direction guiding unit 51 may become an ultrasonic wave lens to guide the ultrasonic wave generated at the vibrating elements 52_1 to 52_N in a predetermined direction, the direction guiding unit 51 may have a concave shape or a convex shape. The transferring unit 55 may place the ultrasonic wave unit at the inputting container, at the transferring passage or at the inner part of the heat exchanger for transferring the ultrasonic wave generated at the vibrating elements 52_1 to 52_N in a predetermined direction through the ultrasonic wave transferring member 56. The ultrasonic wave unit may be coupled to the heat exchanger by the fixing unit 53. The ultrasonic wave limiting unit 54 may be arranged at the round surface of the fixing unit 53 for preventing the ultrasonic wave from being transferring to the housing 51 or any other route. The transfer limiting member 57 or the ultrasonic wave limiting unit 54 may be a porous material or a sound absorbing material capable of absorbing a sound or a vibration, and the ultrasonic transferring member 56 may be made of a metal material with a high density. The vibrating element for receiving a reflected ultrasonic wave may be arranged at the ultrasonic wave unit. The ultrasonic wave unit may transmit the ultrasonic wave to the homogenous solution for stabilizing, and it is advantageous that the ultrasonic wave has to be transmitted in a direction where the reflected ultrasonic wave is minimum, Therefore, the transmitting direction of the ultrasonic wave may be controlled according to a strength or a direction of the wave received by the receiving vibration element. The strength information of the reflected ultrasonic wave received by the receiving vibrating element may be transmitted to a controlling unit, and the controlling unit may control an applying direction of the ultrasonic wave unit according to the strength information of the reflected ultrasonic wave. The transmitting direction of the ultrasonic unit may be control in various ways, for example, the transmitting direction may be controlled by regulating a curvature of the direction guiding unit 51. The ultrasonic wave may be applied to the homogeneous solution in various ways, not limit to.

Figure 6:
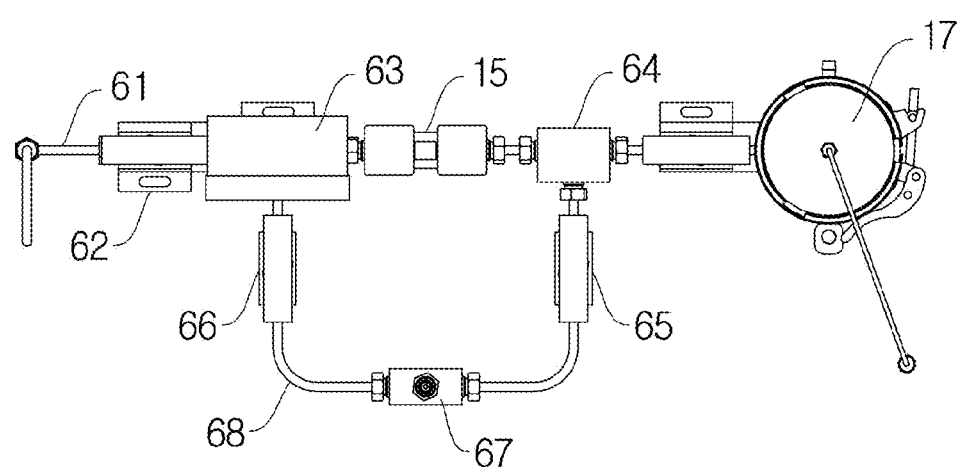
FIG. 6 shows an exemplary embodiment of an inverse flow inducing structure of the present invention.

FIG. 6 shows an exemplary embodiment of an inverse flow inducing structure of the present invention.

Referring to FIG. 6, the raw material solution may be made of the homogeneous solution by the homogeneous module 15, and a high pressure in a 10,000 to 50,000 psi range may be applied to the raw material solution within the homogeneous module 15. The dispersoid may be crushed by such high pressure to be dispersed homogeneously in the dispersion medium. The dispersoid may be crushed in micrometer size or nanometer size, as the homogeneous process may be performed in a high pressure. In the process of crushing, some dispersoid can't flow and may be accumulated within the homogeneous module 15. The required pressure for homogenizing may become higher by the accumulation of the dispersoid. A reverse module for solving the problem may be arranged at the homogenizer. The reverse module may have a function that the raw material solution for being homogenized at the homogeneous module 15 can flow in a reverse direction. The reverse unit may comprise a diverging reverse line 68 connecting both sides of the homogeneous module 15, and the raw material solution may be made to flow reverse within the homogeneous unit 15 by arranging a proper controlling valve. An inner pressure of the homogeneous module 15 may be measured by the pressure gauge. And when the measured inner pressure may deviate from a predetermined pressure range, the reverse unit may be actuated. A pair of flow controlling blocks 63, 64 may be formed at both sides of the homogeneous module 15, and it can be limited that the raw material solution supplied through the transferring pipe 14 flows to the heat exchanger 17 via the homogeneous module 15. The raw material solution can flow through a first flow controlling block 63, a first reverse controlling valve 65, a second flow controlling valve 66, a second flow controlling block 64 and the homogeneous module 15. The dispersoid accumulated within the homogeneous module 15 by the reverse flow may be removed, and the raw material solution in a course of reverse-flowing may be guided to the outside through an outer guiding unit 67. The reverse unit may guide the reverse-flow in various ways, not limit to.

The homogenizer according to the present invention may be used for mixing a water and an oil homogeneously. The oil may become an oil component used in a cosmetic industry or a medical industry, for example, the oil may comprise a phytoncide, a lavender oil, a pine tree oil, an orange oil or the like. The weight ratio of the water to the oil may be water:oil=100; 0.1 to 20, not limited to. The raw material solution may become the water and the oil, and the water and the oil may become a dispersion media and a dispersoid. The raw material solution consisting of the water and the oil may be input into the homogeneous module to be made of a homogeneous solution. And then, a pressure of 10,000 to 20,000 psi may be applied to the raw material solution in a process of homogenizing. The homogeneous solution may be transferred to the heat exchanger, and the homogeneous solution may be stabilized at the heat exchanger. The ultrasonic wave of 20 kHz to 25 kHz may be applied to the homogeneous solution in a process of heat-exchanging, thereby the homogeneous solution may be stabilized. The homogeneous mixing composition of the water and the oil made by the above-mentioned method may be maintained without some layer separation, and can be used in various industries.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A homogenizer comprising:
    an inputting container for inputting a raw material solution;
    a pressing module for applying a pressure to the input raw material solution;
    a homogenizing module for making the raw material solution as a homogenous solution using the pressure applied by the pressing module;
    a heat exchanger for stabilizing and discharging the homogeneous solution; and
    an ultrasonic wave unit for applying an ultrasonic wave to the raw material solution or the homogeneous solution.

2. The homogenizer according to claim 1, wherein the homogeneous module comprises a staying volume formed at a passage to connect a transferring pipe for transferring the raw material solution.

3. The homogenizer according to claim 1, wherein the homogeneous module comprises a homogeneous cell (HC) changing a flowing passage to cause an impact of the raw material solution.

4. The homogenizer according to claim 3, wherein an impact inducing block is placed within the homogeneous cell (HC) for causing the raw material solution to flow in a horizontal and vertical direction.

5. The homogenizer according to claim 1, wherein the raw material solution is a water and an oil.

6. The homogenizer according to claim 1, wherein the ultrasonic wave unit is arranged at the heat exchanger.

7. The homogenizer according to claim 6, wherein the ultrasonic wave unit applies an ultrasonic wave of 20 kHz to 10 MHz frequency.

8. The homogenizer according to claim 1, wherein the pressure applied by the pressing module is 10,000 to 40,000 psi.

9. The homogenizer according to claim 1, wherein the homogenizer comprises an inverse flow guiding module.

* * * * *